Patented Apr. 24, 1951

2,550,269

UNITED STATES PATENT OFFICE 2,550,269

PRESERVATION OF FOOD PRODUCTS

Lloyd B. Jensen and Joseph E. Sherman, Chicago, Ill., assignors to Swift & Company, Chicago, Ill., a corporation of Illinois No Drawing. Application June 20, 1949,
Serial No. 100,292

6 Claims. (Cl. 99—150)

The present invention relates to the preparation and use of an antibiotic substance, and more particularly to the preparation and use of an antimicrobial substance of plant origin.

The invention contemplates the utilization of an antibiotic substance naturally associated with the tissues of the plant *Alpinia officinarum*, commonly called galingale root.

An object of the present invention is to provide a potent antibiotic substance of plant origin.

A further object of the invention is to provide an antibiotic substance which is nontoxic to humans.

An additional object of the invention is to provide an antibiotic substance which is heat stable.

Another object of the invention is to employ an antibiotic substance having an origin in a vegetative plant as an effective preservative for food products.

In achieving the objects of the present invention, the finely cut or ground galingale root is treated with a suitable non-aqueous, organic solvent, such as acetone. The acetone layer containing the constituents of the plant tissue soluble therein is separated from the acetone-insoluble fibrous mass, the acetone removed therefrom, and the extract taken up in a carrier solvent, such as ethanol.

The following example illustrates the preferred embodiment of the invention, and the tests falling thereunder illustrate the potency of the material obtained in accordance with the processes of the example.

*Example.*—50 grams of the root of the *Alpinia officinarum* plant were finely ground. The ground plant tissue was then placed in a flask and covered with acetone. The flask was held at a temperature of 65° F. for approximately 24 hours and shaken at intervals. The acetone layer containing the acetone-soluble constituents of the plant was separated from the insoluble material by filtration, and the acetone was distilled off under vacuum at 42° C. The residue was taken up in ethyl alcohol (95 per cent) so that 1 ml. of the alcoholic extract contained the acetone-soluble material in 5 grams of the original plant tissue.

In order to evaluate the effectiveness of the antibiotic material in the alcohol solution obtained in accordance with the example, the following test was performed:

Serial dilutions of the extract were made in 10 cc. broth tubes and the tubes inoculated with bacteria. Each 10 ml. broth tube contained between about 30,000 to 75,000 cells of a food poisoning strain of *Staphylococcus aureus*, *Bacillus niger*, *Clostridium sporogenes*, *Achromobacter perolens*, *Salmonella typhimurium*, and *Pseudomona fluorescens*. The tubes were allowed to incubate at a temperature of 37° C. and were inspected for bacterial growth at the end of 1, 3, and 6 days. In Table I are tabulated the results obtained with the aforesaid bacteria. The minus signs in said table indicate no bacterial growth, and the positive signs indicate the presence of viable bacteria at the incubation periods specified.

*Table I*

| Dilutions of extract | Days incubation | Sal. typhimurium | S. aureus | B. niger | Pseudomonas fluorescens | Cl. sporogenes | Achromobacter perolens |
|---|---|---|---|---|---|---|---|
| 1:100 | 1 | + | − | − | + | − | + |
|  | 3 | − | − | − | − | − | − |
|  | 6 | − | − | − | − | − | − |
| 1:500 | 1 | + | − | − | + | − | + |
|  | 3 | − | − | − | − | − | − |
|  | 6 | − | − | − | − | − | − |
| 1:1,000 | 1 | + | − | + | + | − | + |
|  | 3 | − | − | − | − | − | − |
|  | 6 | − | − | − | − | − | − |
| 1:2,000 | 1 | + | + | + | + | + | + |
|  | 3 | − | − | − | − | − | − |
|  | 6 | − | − | − | − | − | − |
| Control | 1 | + | + | + | + | + | + |

The galingale root antibiotic shows marked activity against the gram positive bacteria *Staphylococcus aureus* and *Bacillus niger* and *Clostridium sporogenes*, although the data given in the above table indicate that the effects of the said antibiotic vary in potency when tested against different organisms. Thus, the extract kills *Staphylococcus aureus* and *Clostridium sporogenes* in dilutions as high as 1 to 1000, and *Bacillus niger* in dilutions as high as 1 to 500. The bactericidal properties of the extract, lethally effective in the dilutions indicated for the various organisms, were demonstrated by inoculating nutrient agar plates with 0.1 cc. of the aforesaid dilutions which had been allowed to incubate for five days. After five days' incubation of the inoculated plates, no viable bacteria were observed as a result of the transfers.

Although acetone is the preferred primary solvent, we have found that other nonaqueous organic solvents are suitable as the extracting solvent. For example, dioxane, ethyl acetate, methyl ethyl ketone, and ethanol may be used. We have also found a water extraction of the antibiotic material to be ineffective as an antibiotic, apparently because of the proteinaceous material dissolved therein.

The heat stability of the antibiotic material was determined by heating portions of the material to a temperature of 60-99° C. for as long as 15 minutes and then inoculating with *Staphylococcus aureus*. After incubating the material at a temperature of approximately 75° F. for six days, the lethal potency was 1:1000.

It is obvious that many variations in the solvent treating process may advantageously be employed. For example, since the antibiotic material isolated from the galingale root is very heat stable, solvent temperatures may range from room temperature to boiling temperature of the solvent with consequent variations in extraction time. The higher the temperature, generally the less time is required for extraction. We have found it preferable to process the antibiotic substance contained in the galingale root by a two-stage solvent process involving first treating the substance with a primary solvent which is substantially removed, and then taking up the resulting extract with another solvent so as to form a solution which is a convenient form of using the product. We have found that acetone is a most effective primary solvent in producing the antibiotic substance from the plant tissue. After evaporating off the acetone, the preferred solution is made with a carrier solvent such as ethanol, which may be consumed internally without harm. By using ethyl alcohol, we also utilize its well-known properties, such as nontoxicity and ability to prevent contamination.

In the processing of food products, a serious problem is the preservation thereof; and although great strides have been made in improving the quality and keeping time of various food products by refrigeration, canning, curing, plant sanitation, etc., the problem of preservation of food requires the constant attention of the food processor to improve long-established methods of treating food and to devise new means of food control.

Food spoilage is due primarily to microbial action, and the species of microorganism responsible for food deterioration are numerous. The sporing genera, Clostridium and Bacillus, for example, when contaminating food, cause food spoilage. Another serious concern of the food handler is food poisoning, which is often of an insidious nature because food products may be contaminated with one or more of the harmful bacteria referred to herein and yet appear organoleptically sound. Among the food poisoning bacteria, the most common food poisoner is Staphylococcus.

The antibacterial substance of the present invention may be used to retard or prevent microbial growth in various food products, all of which harbor pathogenic organisms in varying degrees. The antibiotic material disclosed herein, therefore, may advantageously be employed, for example, in treating meat products, such as hams, sausages, and canned meats; cream fillings for pastries, such as cream puffs, chocolate éclairs, custards, and the like; and canned vegetables to prevent swelling due to organisms, such as the genus Bacillus.

The invention will be more fully understood from the following description of methods of using the antibiotic substance.

As hereinbefore mentioned, we have found that the antibiotic reagent herein described is lethal to a number of microbes in a 1 to 1000 dilution of the extract, the extract being of such strength that 1 ml. of the alcoholic solution thereof contained the acetone-soluble constituents in 5 grams of the plant. Therefore, the addition of 1 part of the solution to 1000 parts or less of the conventional pickling solution will result in a meat product cured therewith which has a very marked increase in resistance to the development of pathogenic organisms.

The following is an example of a curing pickle stock, which may be used in a process for quick-curing hams when provided with antibiotic substance within the proportions outlined above; that is, the antibiotic substance may be added in an amount such as to effect a 1 to 500 dilution of the antibiotic material of the arbitrary strength herein described (1 ml.=5 g. of tissue):

To 100 gallons of a 90° salometer solution there are added:

7 lbs. sodium nitrate
10 oz. sodium nitrite
20 lbs. sugar
378.5 cc. antibiotic solution.

Luncheon meat was cured according to conventional methods in which the antibiotic substance was present in a 1 to 500 dilution. The meat product was placed in six 6-pound cans and retorted to an inside temperature of 155° F. and incubated at 99° F. After 30 days of incubation, no swelling of the cans could be observed. The control cans swelled in one week.

A further example of the utility of the said antibiotic material is the use in a cream filling for various pastries. To determine the effectiveness, a standard cream filling used in éclairs was inoculated with a bacterial solution containing 100,000 living *Staphylococcus aureus* S-1 per 100 ml. and the filling incubated at a temperature between 75° F. and 80° F. The results of tests are given in Table II.

*Table II*

| Antibiotic | Dilution in cream filling | Incubated at 75°-80° F. Staphylococcus (S-1) per gram | | |
|---|---|---|---|---|
| | | 24 hrs. | 48 hrs. | 72 hrs. |
| Galingale root | 1:300 | — | — | 25,000,000 |
| No antibiotic | 0 | — | — | 140,000,000 |
| No Staphylococci | 0 | 0 | 0 | 0 |

The foregoing tests indicate that the antibiotic preparation exerts a pronounced inhibiting action against the *Staphylococcus aureus* in cream fillings.

Obviously, many modifications and variations of the invention as hereinbefore set forth may be made without departing from the spirit and scope thereof, and therefore only such limita-

We claim:

1. In the process of treating food products, the step of adding to a food product a small amount of an antibiotic substance derived from the plant *Alpinia officinarum* by treatment with a non-aqueous organic solvent to preserve said food product against pathogenic bacteria responsible for food poisoning and spoilage.

2. In the process of quick-curing meats wherein a pickling solution is injected into said meat, the step of adding to said pickling solution a small amount of the antbiotic substance derived from the plant *Alpinia officinarum* by treatment with a non-aqueous organic solvent to substantially retard the growth of pathogenic bacteria responsible for food spoilage and poisoning after the said solution is injected into the said meat.

3. In the process of preparing pastries containing fillings subject to spoilage by pathogenic bacteria, the step of adding to the said fillings a small amount of the antibiotic substance derived from the plant *Alpinia officinarum* by treatment with a non-aqueous organic solvent to substantially retard the growth of pathogenic bacteria in the said fillings.

4. A meat pickle including a small amount of an antibiotic substance derived from the plant *Alpinia officinarum* by treatment with a non-aqueous organic solvent.

5. A cream filling for pastries including a small amount of an antibiotic substance derived from the plant *Alpinia officinarum* by treatment with a non-aqueous organic solvent.

6. In the process of treating food products, the step of adding to a food product a small amount of an alcoholic solution of an antibiotic substance derived from the plant *Alpinia officinarum* to preserve said food product against pathogenic bacteria responsible for food poisoning and spoilage.

LLOYD B. JENSEN.
JOSEPH E. SHERMAN.

REFERENCES CITED

The following references are of record in the file of this patent:

UNITED STATES PATENTS

| Number | Name | Date |
|---|---|---|
| 469,850 | Chesebrough | Mar. 1, 1892 |
| 2,084,864 | Paddock | June 22, 1937 |
| 2,098,110 | Schertz et al. | Nov. 2, 1937 |
| 2,117,478 | Hall | May 17, 1938 |
| 2,180,750 | Urbain | Nov. 21, 1939 |

OTHER REFERENCES

"Nature," May 13, 1944, vol. 153, page 598, article entitled "Antibacterial Substances in Green Plants."

"Chemical and Engineering News," September 1945, page 1622, article entitled "Penicillin as a Preservative."

"The American Woman's Cook Book," 1945, by Ruth Berolzheimer, published by Consolidated Book Publishers, Chicago, page 475.